United States Patent
Chen et al.

(10) Patent No.: US 8,806,029 B2
(45) Date of Patent: Aug. 12, 2014

(54) SESSION-CACHE-BASED HTTP ACCELERATION

(75) Inventors: Tian Chen, Beijing (CN); Wei Hua Guo, Beijing (CN); Chaohua Wan, Beijing (CN)

(73) Assignee: Juniper Networks, Inc., Sunnyvale, CA (US)

(*) Notice: Subject to any disclaimer, the term of this patent is extended or adjusted under 35 U.S.C. 154(b) by 443 days.

(21) Appl. No.: 12/422,439

(22) Filed: Apr. 13, 2009

(65) Prior Publication Data

US 2010/0235522 A1  Sep. 16, 2010

(30) Foreign Application Priority Data

Mar. 11, 2009  (CN) .......................... 2009 1 0127106

(51) Int. Cl.
*G06F 15/16* (2006.01)
*H04L 29/08* (2006.01)

(52) U.S. Cl.
CPC ............... *H04L 67/14* (2013.01); *H04L 67/02* (2013.01); *H04L 67/2842* (2013.01); *H04L 67/148* (2013.01)

USPC .......................................... 709/228; 709/234

(58) Field of Classification Search
None
See application file for complete search history.

(56) References Cited

U.S. PATENT DOCUMENTS

| 2006/0168328 A1* | 7/2006 | Shimada et al. | 709/238 |
| 2007/0078986 A1* | 4/2007 | Ethier et al. | 709/227 |
| 2007/0153721 A1* | 7/2007 | Le et al. | 370/328 |
| 2010/0082747 A1* | 4/2010 | Yue et al. | 709/204 |

* cited by examiner

*Primary Examiner* — Liangche A Wang
*Assistant Examiner* — Suraj Joshi
(74) *Attorney, Agent, or Firm* — Harrity & Harrity, LLP (57) ABSTRACT

A method performed by a device includes receiving a first Hyper-Text Transfer Protocol (HTTP) packet, creating a first session based on the HTTP packet, and creating a session cache entry for the first session. The method also includes receiving a second HTTP packet, performing a session cache lookup to identify a match of the second HTTP packet with the session cache entry, and creating a second HTTP session based on the match of the second HTTP packet with the session cache entry.

21 Claims, 8 Drawing Sheets

SESSION-CACHE-BASED HTTP ACCELERATION

BACKGROUND

Network security devices typically limit access to network resources based on various authentication procedures designed to limit access to only authorized users executing approved applications. One problem with granting access to a client device in this manner is that it typically takes considerable processing resources to determine whether the client device is an authorized user executing an approved application. In addition, conventional authorization procedures do not scale well for high speed networks.

Accessing a web page via the Internet is an example of a type of network activity that may be subject to screening by a network security device. When a user accesses a web page (or web site) through a local browser application (e.g., Internet Explorer, Netscape, FireFox, etc.), the application downloads content corresponding to the web page and renders (displays) the web page. A web page generally includes one or more constituent files (e.g., inline objects) that represent individual components (e.g., images, frames, text, etc.) making up the complete web page as displayed by the browser application. Each inline object, including the web page itself, is identified by a uniform resource locator (URL) that uniquely identifies the location of the web page on the Internet. Web pages are generally coded in hypertext markup language (HTML). In order to display a web page, the browser application first requests the web page content, and then parses the HTML associated with the web page to gather references to remaining URLs and instructions for displaying the web page. The browser application executes requests required to obtain remaining inline objects necessary to display the web page.

A measure of how long it takes for a web page to be displayed may be referred to as the response time of the web page or a web page download response time. The web page download response time may be a function of cumulative response times (e.g., inline object response times) associated with inline objects that constitute the web page. A web page may be accessed via an Internet protocol, such as hypertext transfer protocol (HTTP). The most common version of HTTP in use today is HTTP Version 1.1 (or HTTP 1.1). HTTP 1.1 operates over a transport layer provided by a transport control protocol (TCP). HTTP 1.1 distinguishes itself from HTTP 1.0, an earlier version of HTTP, primarily in that it can use the same TCP connection to query one or more inline objects. For HTTP 1.0, a separate TCP connection was established for each individual inline object query. However, HTTP 1.1 may depend on the implementation of particular web browsers and the strategy used by web browsers to group the connections.

SUMMARY

In one implementation, a method, performed by a device, may include receiving a first Hyper-Text Transfer Protocol (HTTP) packet, creating a first session based on the HTTP packet, and creating a session cache entry for the first session. The method may also include receiving a second HTTP packet, performing a session cache lookup to identify a match of the second HTTP packet with the session cache entry, and creating a second HTTP session based on the match of the second HTTP packet with the session cache entry.

In another implementation, a device may include a memory to store a plurality of instructions and a session cache and a processor. The processor may execute instructions in the memory to: receive a first Hyper-Text Transfer Protocol (HTTP) packet, create a first session based on the HTTP packet, store information from the first session in the session cache, receive a second HTTP packet, match information from the second HTTP packet with information from the first session stored in the session cache, and create a second HTTP session based on the matched information.

In a further implementation, a device may include means for means for creating a first session based on a first HTTP packet, means for storing information from the first session in a session cache, means for receiving a second HTTP packet, means for creating a second HTTP session based on the stored information from the first session, and means for installing the second session.

In still another implementation, a computer-readable memory device may store computer-executable instructions. The computer-readable memory may include one or more instructions for receiving a Hyper-Text Transfer Protocol (HTTP) packet; one or more instructions for performing a session cache lookup to identify a match of the HTTP packet with a session cache entry, the session cache entry including a source IP address field, a destination IP address field, a destination port field, and a protocol field; one or more instructions for duplicating the session cache entry to create a session for the HTTP packet; and one or more instructions for installing the session for the HTTP packet.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Systems and methods described herein may provide a fast session creation path within a network device for HTTP connections, such as connections for the same web page/site. A session cache may be created from a first connection based on the source Internet Protocol (IP) address, destination IP address, destination port, and/or protocol identified in the HTTP packet(s). Session cache entries may later be used to duplicate new sessions for subsequent connections for the same web page/site, thus potentially improving response times for the web page/site.

As used herein, the term "packet" may refer to packets of all types or any other units of information or data, including, but not limited to, fixed length cells and variable length packets, each of which may or may not be divisible into smaller packets or cells. The term "packet" as used herein may also refer to both the packet itself or a packet indication, such as, but not limited to all or part of a packet or packet header, a data structure value, pointer or index, or any other part or direct or indirect identification of a packet or information associated therewith.

Exemplary Network

Figure 1:
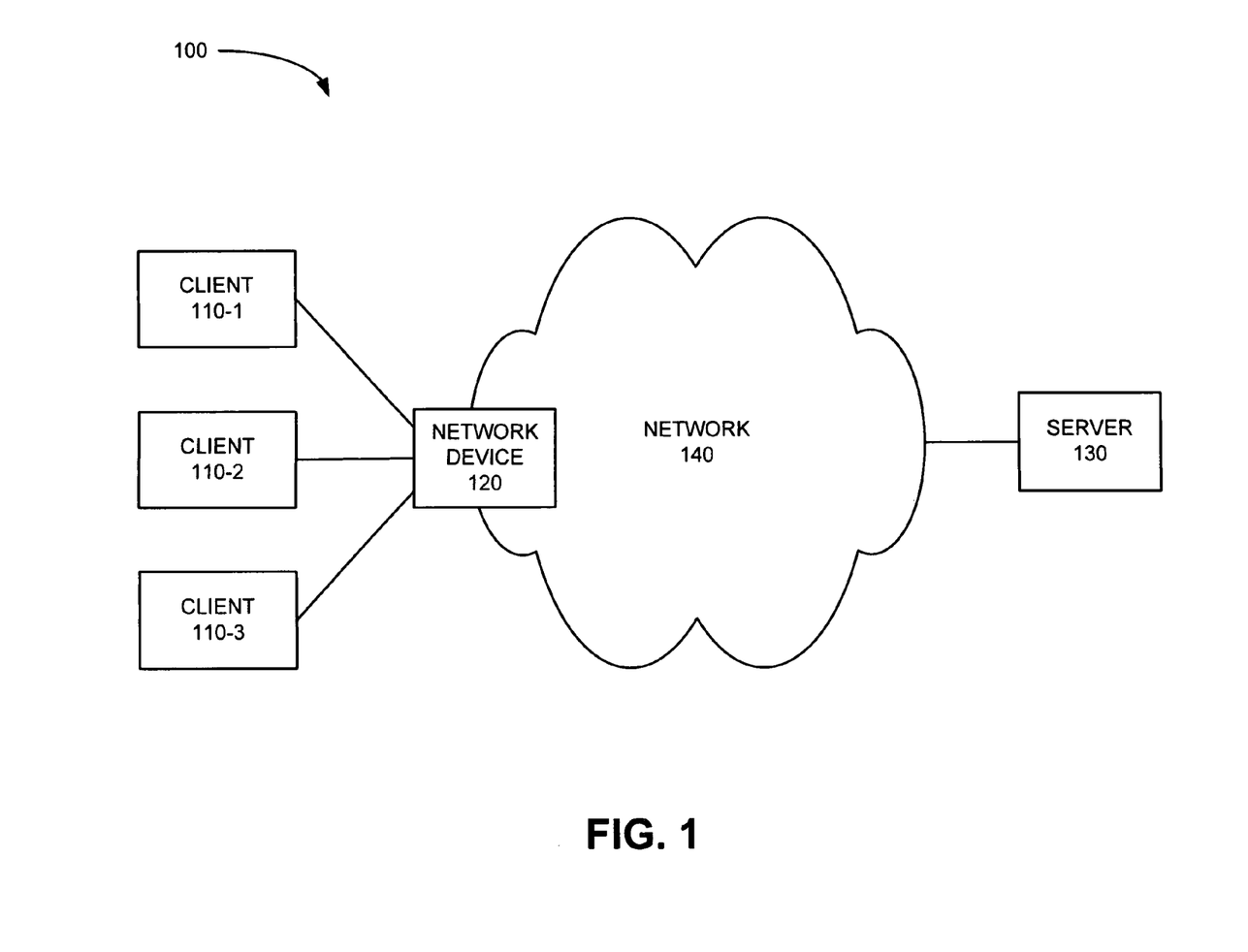
FIG. 1 is a diagram illustrating an exemplary network in which systems and methods described herein may be implemented.

FIG. 1 is a diagram of an exemplary network 100 in which systems and methods described herein may be implemented. Network 100 may include clients 110-1, 110-2, and 110-3 (referred to herein collectively as "clients 110" and generically as "client 110"); network device 120; server 130; and network 140. The exemplary configuration illustrated in FIG. 1 is provided for simplicity. It should be understood that a typical network may include more or fewer devices than illustrated in FIG. 1. In addition, other devices that facilitate communications between the various entities illustrated in FIG. 1 may also be included in network 100.

Clients 110 may each include a device, such as a personal computer, a laptop computer, a personal digital assistant (PDA), a web-based appliance, a wireless telephone, a video game console, or another type of computation or communication device, or a process running on one of these devices. Clients 110 may communicate with server 130 over network 140 via wired, wireless or optical connections.

Network device 120 may include a firewall device, an intrusion detection system, a router, a server, or another device that performs security related functions associated with accessing resources in network 100, such as server 130 and/or resources associated with server 130. Network device 120 may apply access policies to determine whether to grant, deny or limit access to the desired resource. Network device 120 may also perform load balancing to more effectively distribute network traffic. Network device 120 may use flow-based routing to accelerate security and traffic-making decisions. In an exemplary implementation, as described further herein network device 120 may store HTTP session information and retrieve HTTP session information to accelerate a subsequent HTTP session creation.

Server 130 may include a server/computing device, or a set of servers/computing devices, that provides clients 110 with access to various resources in network 100. In some implementations, the network resources reside on server 130. In other implementations, the network resources may be located externally with respect to server 130 (not shown in FIG. 1). In one implementation, server 130 may include an application for receiving hypertext transfer protocol (HTTP) requests and/or for providing HTTP responses to clients (e.g., browsers). In one implementation, web server 130 may provide static and/or dynamic web pages, programs, etc.

Network 140 may include one or more networks, such as a local area network (LAN) or a private network, such as a company network or intranet. Network 140 may also include a wide area network (WAN), a metropolitan area network (MAN), a telephone network, such as the Public Switched Telephone Network (PSTN), the Internet, a cellular network, a satellite network, another type of network or a combination of networks.

Exemplary Network Device Configuration

Figure 2:
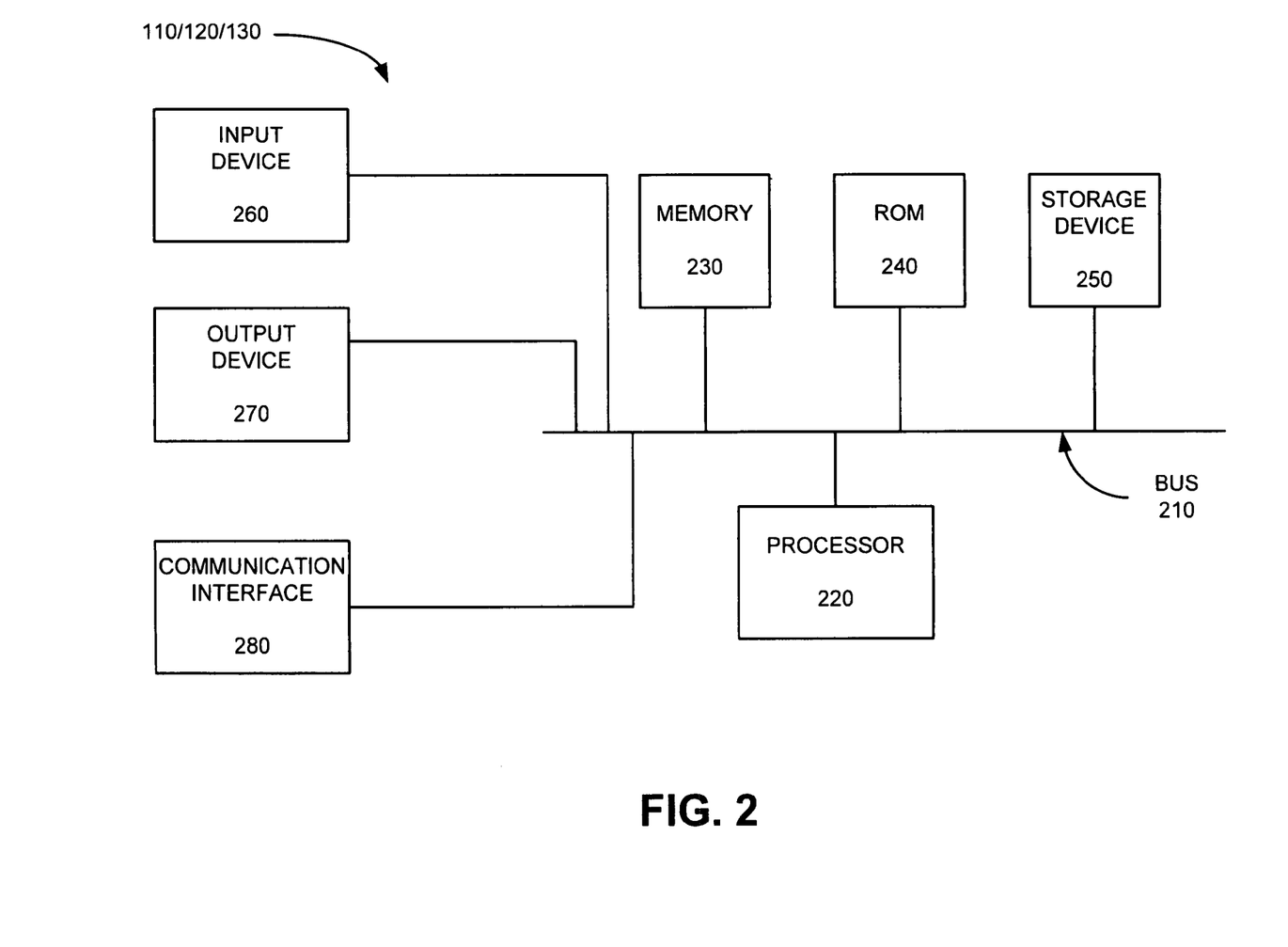
FIG. 2 is a block diagram illustrating an exemplary configuration of a client, the network device and the server of FIG. 1.

FIG. 2 illustrates an exemplary configuration of network device 120. Clients 110 and server 130 may be configured in a similar manner. Network device 120 may include a bus 210, a processor 220, a main memory 230, a read only memory (ROM) 240, a storage device 250, an input device 260, an output device 270, and a communication interface 280. Bus 210 may include a path that permits communication among the elements of network device 120.

Processor 220 may include a processor, microprocessor, application specific integrated circuit (ASIC), field programmable gate array (FPGA) or processing logic that may interpret and execute instructions. Memory 230 may include a random access memory (RAM) or another type of dynamic storage device that may store information and instructions for execution by processor 220. In an exemplary implementation, as described further herein, memory 230 may include a session cache for HTTP session information. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to network device 120, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables network device 120 to communicate with other devices and/or systems. For example, communication interface 280 may include a modem or an Ethernet interface to a LAN. Alternatively, communication interface 280 may include other mechanisms for communicating via a network, such as network 140.

Network device 120 may perform processing associated with identifying applications executed by clients 110 and providing access management, as described in detail below. According to an exemplary implementation, network device 120 may perform these operations in response to processor 220 executing sequences of instructions contained in a computer-readable medium, such as memory 230. A computer-readable medium may be defined as a physical or logical memory device.

The software instructions may be read into memory 230 from another computer-readable medium, such as data storage device 250, or from another device via communication interface 280. The software instructions contained in memory 230 may cause processor 220 to perform processes that will be described later. Alternatively, hard-wired circuitry may be used in place of or in combination with software instructions to implement processes described herein. Thus, implementations described herein are not limited to any specific combination of hardware circuitry and software.

Although FIG. 2 shows exemplary components of network device 120, in other implementations, network device 120 may contain fewer, different, differently arranged, or additional components than depicted in FIG. 2. In still other implementations, a component of network device 120 may perform one or more other tasks described as being performed by another component of network device 120.

Exemplary Functional Diagram

Figure 3:
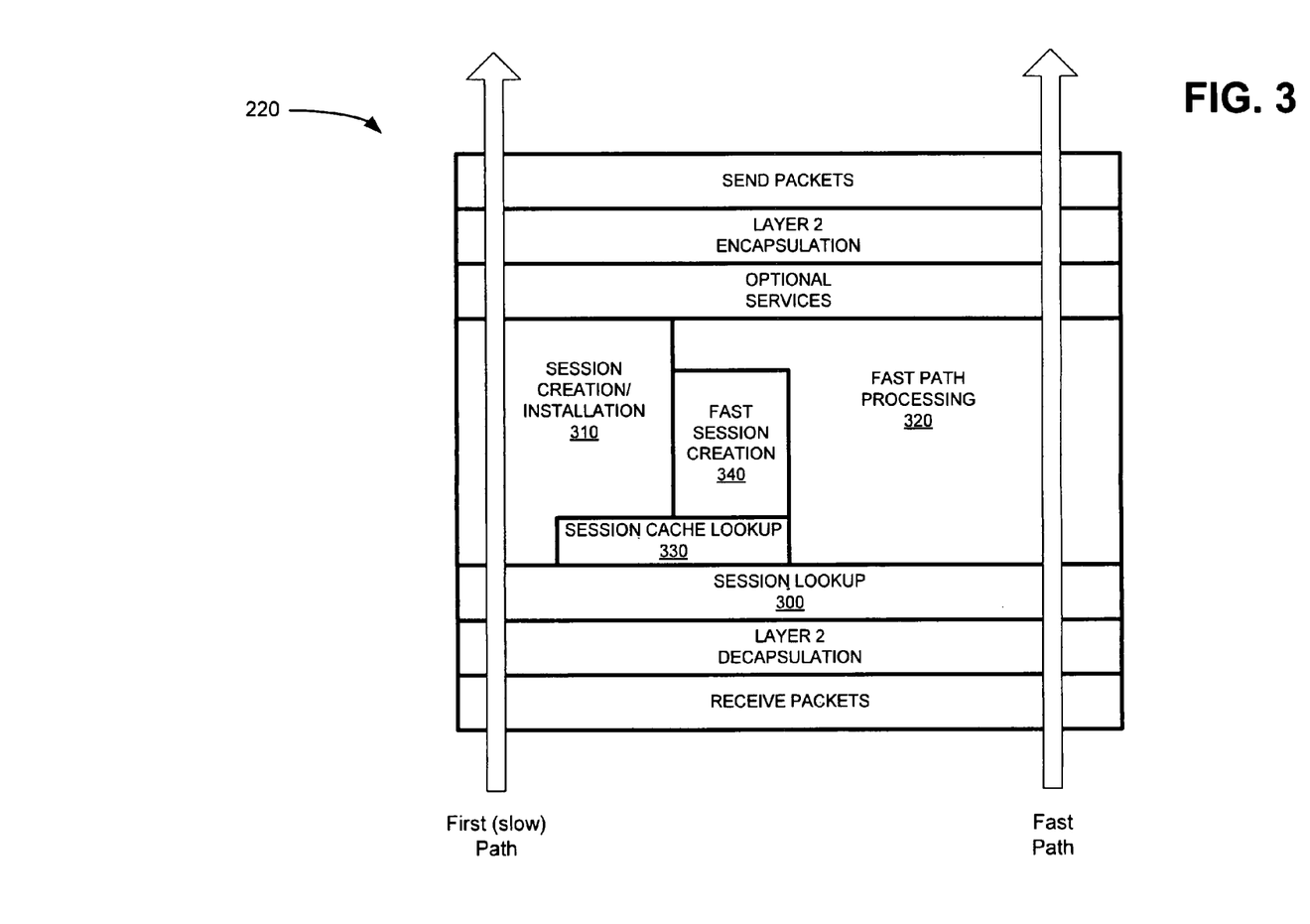
FIG. 3 is an exemplary functional block diagram of components implemented in the network device of FIG. 2.

FIG. 3 illustrates exemplary processing functions performed by network device 120. Referring to FIG. 3, processor 220 of network device 120 may accelerate security and traffic-making decisions through flow-based processing. Generally, flow-based processing may use session state information to minimize individual packet-by-packet decision making and improve packet throughput. As shown, for all incoming packets, processor 220 may conduct processing to receive packets, decapsulate layer 2 headers, and conduct a session lookup 300. At session lookup 300, processor 220 may inspect traffic at a layer 2 level to determine if the packet is part of a new or existing session. Depending on the identified flow (e.g., a new or existing session) at session lookup 300, processor 220 may process the packet along one of two logical paths: a first (slow) path or a fast path. The first (slow) path may require processor 220 to create a new session and install a new session (session creation/installation 310), which may include session set up procedures, conducting policy lookups, route lookups, and other activities. Session creation/installation 310 may also include creating a session cache entry, as will be described below. Fast path processing 320 may allow processor 220 to bypass most procedures associated with session creation to more quickly forward the incoming packet. Generally, fast path processing may be implemented using logic-level/register level hardware. After either session creation/installation 310 or fast path processing 320, processor 220 may apply optional services, encapsulate the packet with a layer 2 header, and send the packets toward their destination.

When a client (e.g., client 110) accesses, for example, a web site, multiple HTTP connections may be established with a server (e.g., server 130). Conventionally, the first packet of each new connection (e.g., an HTTP synchronize (SYN) packet) is processes through the first (slow) path, while the remaining packets related to that HTTP session may then be sent through the fast path. As described further herein, the addition of session cache lookup 330 may allow the first packet of new HTTP connections to be sent through fast session creation 340.

A typical HTTP packet header may include a source IP address, a destination IP address, a source port, a destination port, and a protocol indicator (e.g., HTTP). It has been observed that parameters for multiple HTTP connections for a particular website or web page may have some common characteristics. For example, the incoming interface, the source IP address, the destination port, the policies, and the route for each of these connections is often the same. Also, the destination IP address may have only minor variances within a small group of addresses. Only the source port may tend to consistently change for the multiple HTTP connections for a particular web page (or web site). The common characteristics of a previous HTTP connection may, thus, be used to simplify session creation for subsequent HTTP connections. A session cache data structure to store the reusable information from previous HTTP connections for a particular website. Session cache lookup 330 may use the session cache to determine whether a packet may be directed through fast session creation 340 or the slower session creation/installation 310.

Fast session creation 340 may duplicate software and hardware session information from a matching session cache entry. Particularly, the source IP address, the destination IP address, the destination port, the protocol, and the session token from a matching session cache entry may be used to bypass most of the processing typically required by session creation/installation 310. Installation of the hardware session (e.g., based on the source port of the packet) may also be accomplished at fast session creation 340 before the packet is forwarded to fast path processing 320.

Exemplary Session Cache Data Structure

Figure 4:
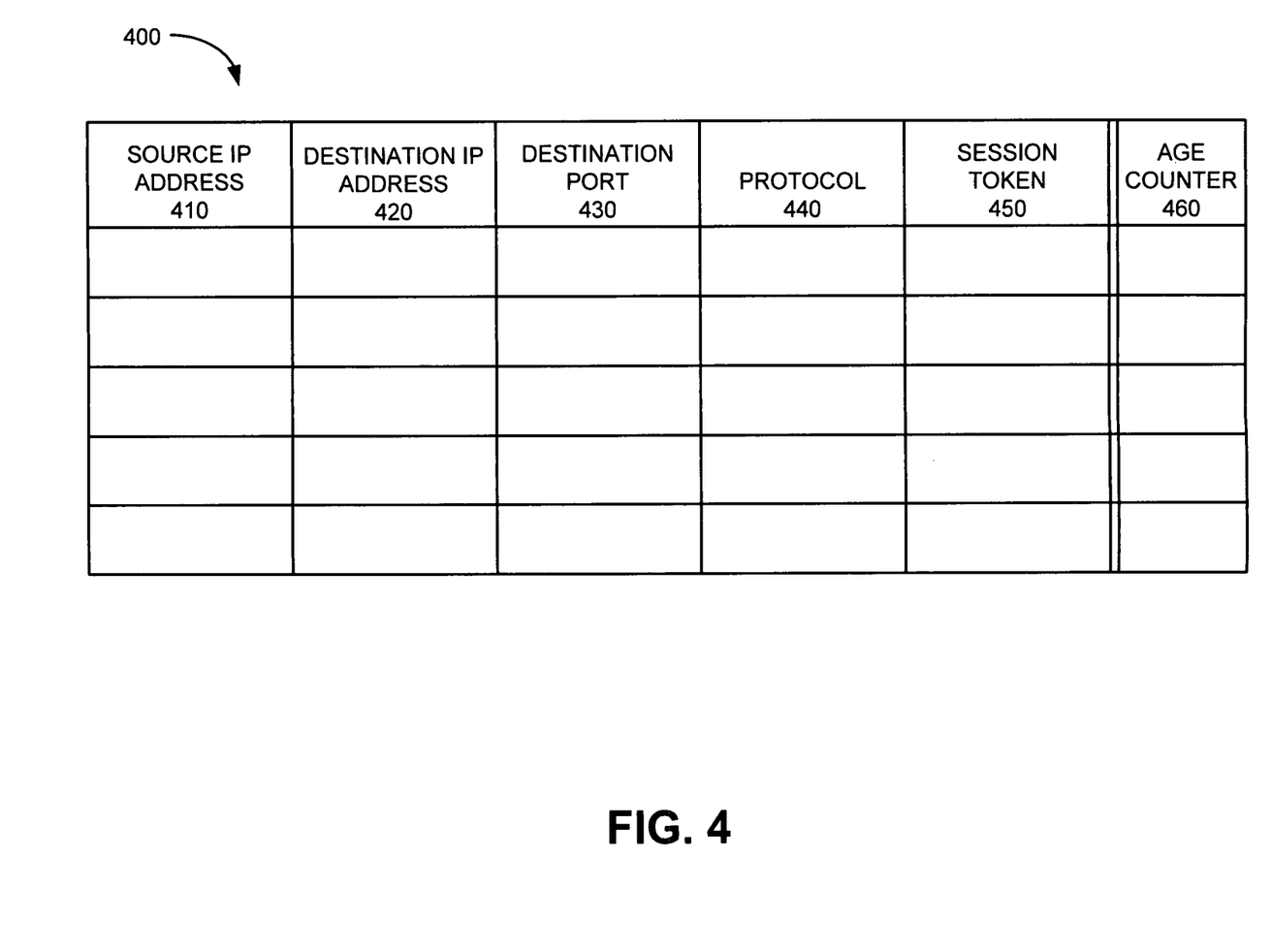
FIG. 4 is an exemplary session cache data structure that may be used for a session cache lookup.

FIG. 4 provides an exemplary session cache data structure 400 that may be used for the session cache lookup. Processor 220 may perform session cache lookup 330 using a session cache 400. Session cache 400 may be created to store reusable software session information and hardware session information created from previous first path processing for a particular website connection. For example, entries for session cache 400 may be created during session creation/installation 310 when an HTTP packet is processed through the slow path in processor 220.

Referring to FIG. 4, session cache data structure 400 may include a table with source IP address field 410, destination IP address field 420, destination port field 430, protocol field 440, session token field 450, and age counter field 460. Source IP address field 410 may represent a source device, such as client 110. In this case, source IP address field 410 may include an IP address, such as an IP address associated with client 110. Destination IP address field 420 may represent a destination server, such as server 130. In this case, destination IP address 420 may include an IP address, such as an IP address associated with server 130 or IP addresses associated with other servers (not shown) in network 100. Destination port field 430 may include information identifying a destination port number associated with data packets transmitted, for example, from client 110. Protocol field 440 may represent a protocol associated with the data packets transmitted from, for example, client 110. Session token field 450 may identify session information that indicates, for example, policy and/or route information for a particular session.

In other implementations, source IP address field 410, destination IP address field 420, destination port field 430, protocol field 440, and session token field 450 may be incorporated as a single hash value. In still other implementations session cache data structure 400 may include fewer, additional, different or differently arranged fields. For example, in one implementation, session token field 450 may not by used.

With the identification of a unique session and/or hash value, processor 220 may generate a new entry to store in session cache data structure 400. Each entry in session cache data structure 400 may also include an age counter (e.g., in age counter field 460) that re-sets when the there is activity for the particular entry. If age counter experiences no activity for a certain period of time (e.g., 60 seconds), then the associated entry may be deemed "aged out" or inactive. Inactive entries may be deleted to create room for new entries in session cache data structure 400.

Exemplary Processing

Figure 5A:
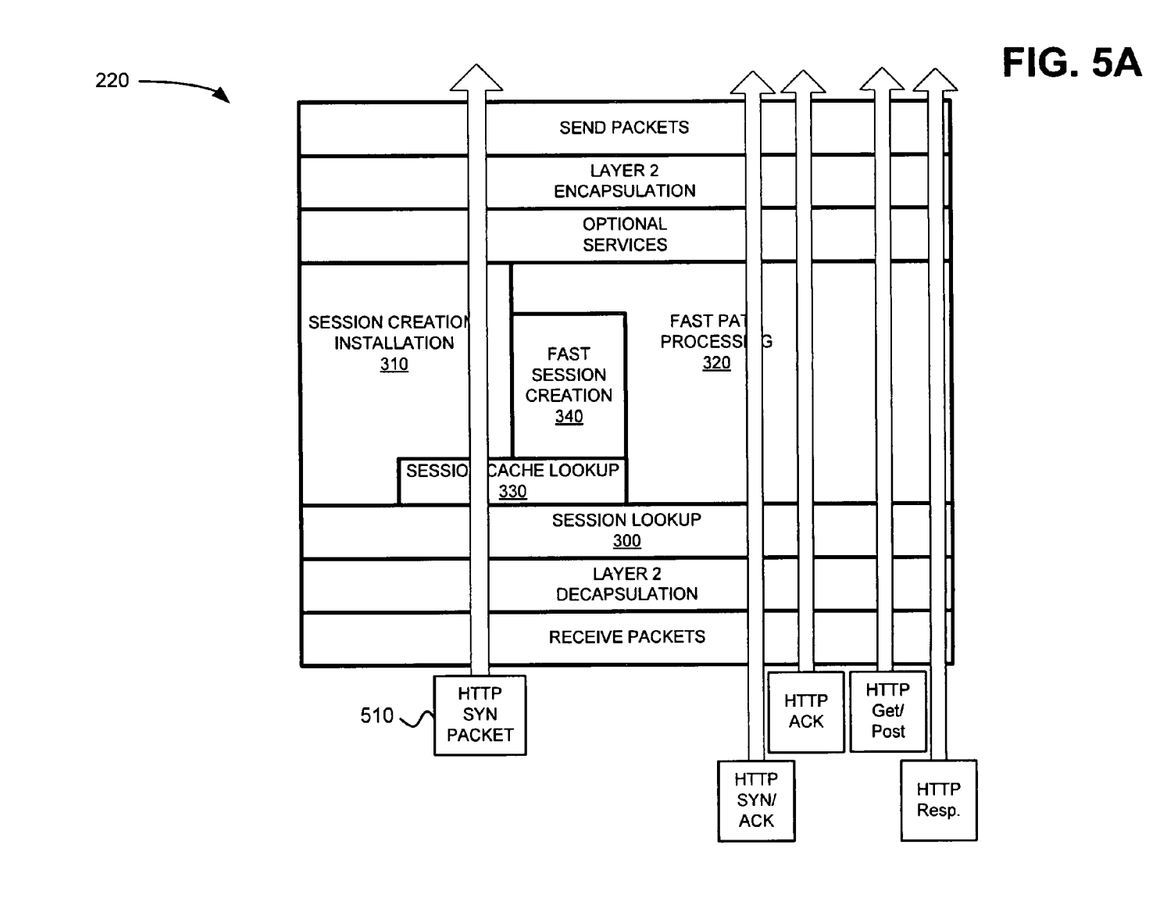
FIGS. 5A and 5B illustrate exemplary HTTP packet processing by the network device of FIG. 2 when a set of HTTP connections is initiated.
Figure 5B:
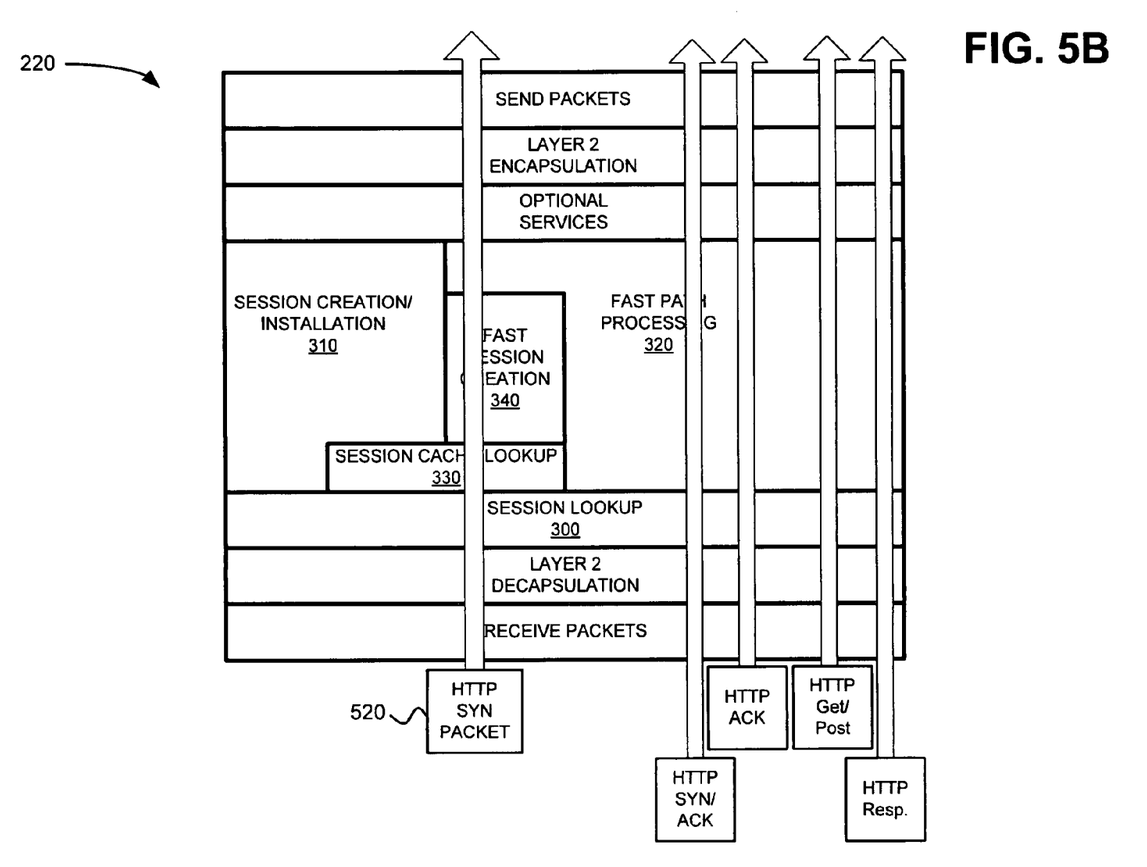

FIGS. 5A and 5B illustrate exemplary HTTP packet processing by processor 220 of network device 120 when a set of HTTP connections (e.g., for accessing a website) is initiated. Assume HTTP SYN packet 510 is sent at a first connection attempt from a client (e.g., client 110) accessing a new website (e.g., at server 130). Also assume HTTP SYN packet 520 is later sent from the same client while accessing the same website.

Referring to FIG. 5A, session lookup 300 may identify an HTTP SYN packet 510 and conduct session cache lookup 330. If HTTP SYN packet 510 does not include header information with a match in session cache data structure 400, then HTTP SYN packet 510 will be sent on a slow path to session creation/installation 310. Among other processing, session creation/installation 310 may create a session cache entry corresponding to header information and/or session token information of HTTP SYN packet 510. Subsequent packets sent/received within the same HTTP session (e.g., HTTP SYN/ACK, HTTP ACK, HTTP Get/Post, and HTTP Response packets) may be directed through fast path processing based on, for example, session lookup 300 identifying an active session ID.

Referring to FIG. 5B, session lookup 300 may identify an HTTP SYN packet 520 and conduct session cache lookup 330. HTTP SYN packet 520 may likely include header information with a match in session cache data structure 400. Particularly HTTP SYN packet 520 may match cached information previously stored from HTTP SYN packet 510. If HTTP SYN packet 520 includes header information with a match in session cache data structure 400, then HTTP SYN packet 520 can be directed to fast session creation 340 and then to fast path processing 320. Processing for subsequent packets sent/received within the same HTTP session (e.g., HTTP SYN/ACK, HTTP ACK, HTTP Get/Post, and HTTP Response packets) may be directed through fast path processing based on, for example, session lookup 300.

Figure 6:
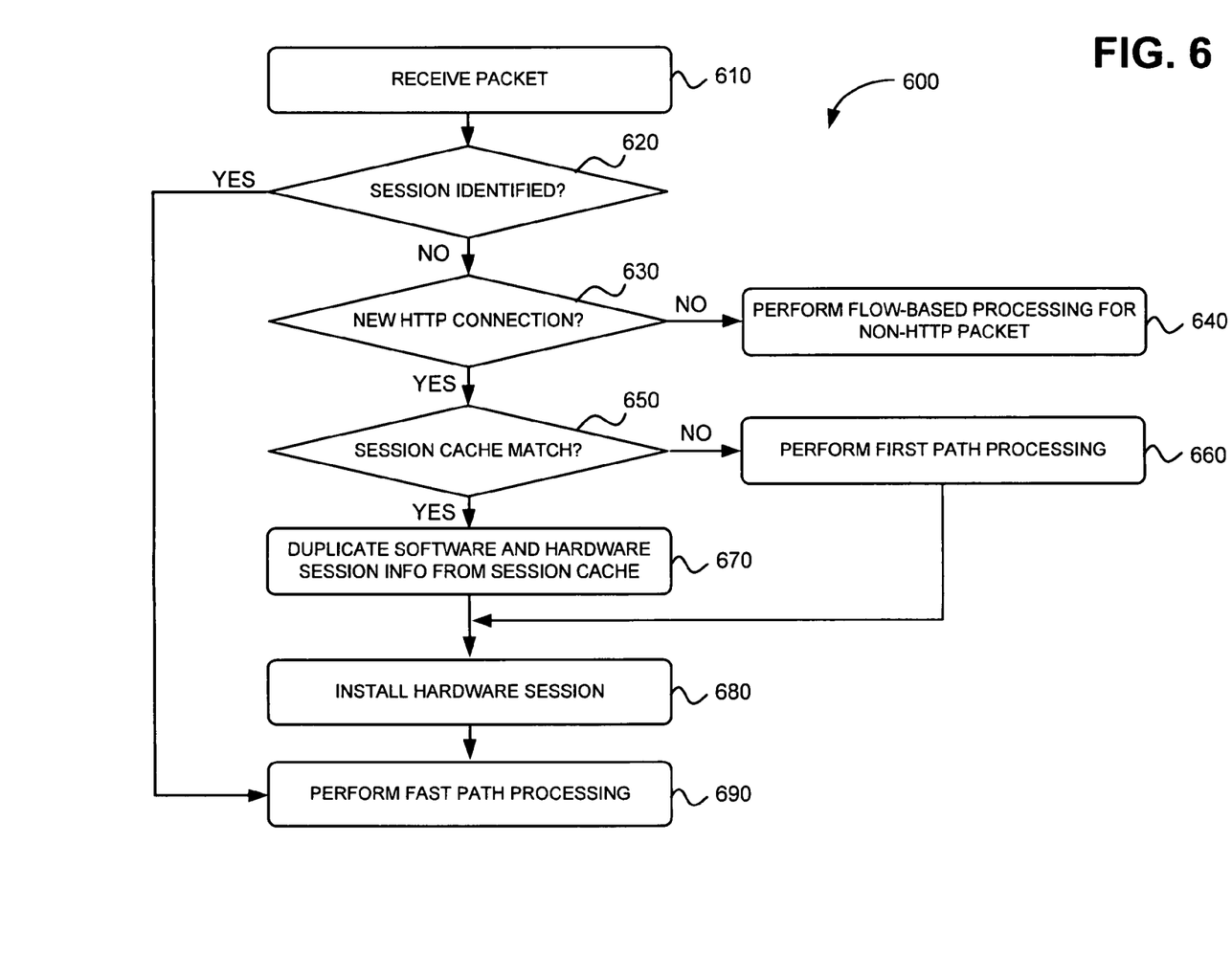
FIG. 6 illustrates an exemplary process for providing a fast session creation path for HTTP connections.

FIG. 6 illustrates an exemplary process 600 for providing a fast session creation path for HTTP connections. In one implementation, exemplary process 600 may be performed by one or more network devices 120. Process 600 may be implemented, for example, within an established TCP/IP connection over a network, such as network 140. Examples of process 600 below may be described in the context of client, such as client 110, accessing a HTML-based web page from a server, such as server 130.

Processing may begin, for example, by receiving a packet (block 610) and determining if a session for the packet is identified (block 620). For example, network device 120 may receive a TCP/IP packet and perform a session lookup to determine if the packet includes a session identifier. The session identifier may indicate that the packet is part of a previously identified flow. If a session is identified for the packet (block 620-YES), fast path processing may be performed (block 690). For example, network device 120 may direct the packet through fast processing path 320 of processor 220.

If a session is not identified for the packet (block 620-NO), it may be determined if the packet is for a new HTTP connection (block 630). For example, network device 120 may determine if the packet is an HTTP SYN packet. If the packet is not for a new HTTP connection (block 630-NO), then flow-based processing for a non-HTTP packet may be performed (block 640). For example, if network device 120 determines that the packet is not associated with an ongoing session and that the packet is not initiating an HTTP session, then the packet will undergo traditional processing, such as slow path processing of a conventional TCP/IP packet.

If the packet is for a new HTTP connection (block 630-YES), it may be determined if there is a session cache match (block 650). For example, in one implementation, network device 120 may conduct a session cache lookup based on the source IP address, destination IP address, destination port, protocol, and session token of the packet. If there is no session cache match (block 650-NO), first path processing may be performed (block 660). For example, network device 120 may direct the packet to session creation/installation 310 within processor 220. Performing first path processing is described in more detail below with respect to FIG. 7.

If there is a session cache match, (block 650-YES), software and hardware session information may be duplicated from the session cache (block 670). For example, network device 120 may direct the packet to fast session creation 340 to copy the source IP address, the destination IP address, the destination port, the protocol, and the session token from a matching session cache entry.

The hardware session may be installed (block 680). For example, network device 120 (e.g., fast session creation 340) may install a hardware session based on the source port of the packet. After the hardware session is installed, the fast session creation may be complete and fast path processing may be performed (block 690).

Figure 7:
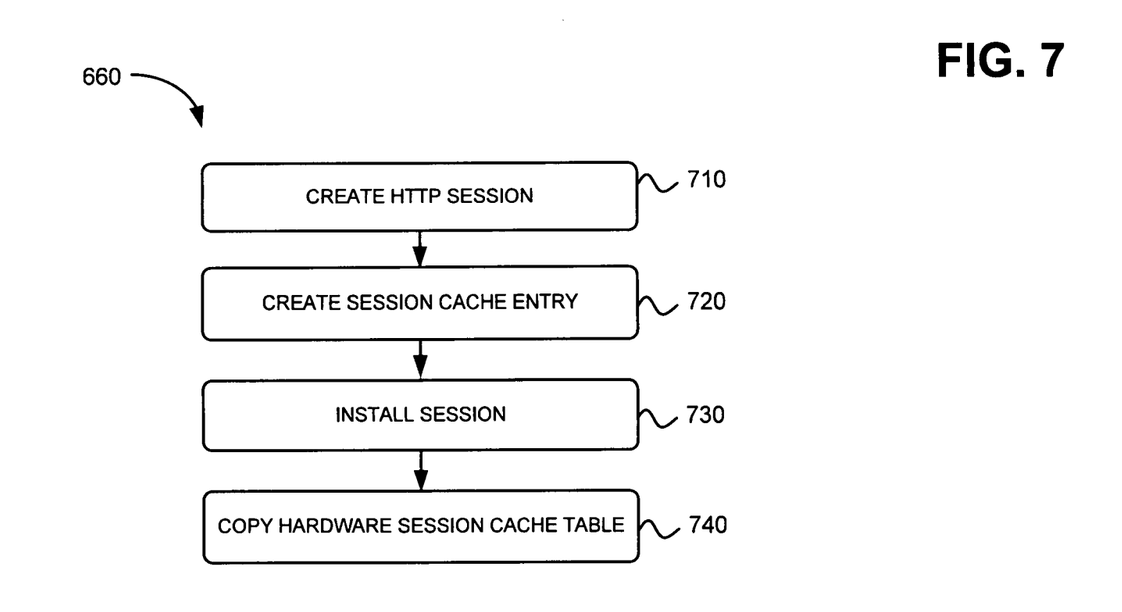
FIG. 7 illustrates an exemplary process for performing the first path processing of FIG. 6.

FIG. 7 is exemplary process for performing the first path processing described above with respect to block 660. An HTTP session may be created (block 710). For example, network device 120 may create a new HTTP session in a traditional manner based on, for example, the source IP address, destination IP address, source port, destination port, and protocol of the HTTP SYN packet.

A session cache entry may be created (block 720). For example, network device 120 may create a session cache entry that includes the source IP address, destination IP address, protocol, and session token of the HTTP SYN packet. The session cache entry may be stored in a memory (e.g., memory 230) for use by session cache lookup 330 for subsequent HTTP packets.

The session may be installed (block 730). For example, network device 120 may install the session for the new HTTP connection in a traditional manner.

The hardware session may be copied to a cache table (block 740). For example, in one implementation, network device 120 may copy the hardware session information (e.g., the destination port) to the session cache entry corresponding to the previously cached new session for the HTTP SYN packet. In another implementation, the hardware session information may be stored in a separate cache table, such as a global cache port table. Copying the hardware session to a cache table may be optional. The destination port information of incoming packets may be optionally used to search for a session cache entry. For example, if the destination port of a HTTP SYN packet matches an entry in the port cache table, a search for corresponding session cache may be conducted.

CONCLUSION

Implementations described herein may enable accelerated session creation for HTTP connections. Systems and/or methods may include receiving a first Hyper-Text Transfer Protocol (HTTP) packet, creating a first session based on the HTTP packet, and creating a session cache entry for the first session. When a second HTTP packet is received, a session cache lookup may be performed to identify a match of the second HTTP packet with the session cache entry. A second HTTP session may be created based on the match of the second HTTP packet with the session cache entry.

The foregoing description of implementations provides illustration and description, but is not intended to be exhaustive or to limit the invention to the precise form disclosed. Modifications and variations are possible in light of the above teachings or may be acquired from Also, while series of blocks have been described with regard to FIGS. 5-7, the order of the blocks may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain implementations described herein may be implemented as "logic" that performs one or more functions. This logic may include hardware—such as a processor, microprocessor, an application specific integrated circuit or a field programmable gate array—or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Further, the terms "table" and "database," as used herein, may refer to any searchable form or arrangement of data within a physical or logical memory device.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a device, a first data unit, the first data unit being associated with establishing a first Hyper-Text Transfer Protocol (HTTP) connection, of a plurality of HTTP connections, between a client and server, the plurality of HTTP connections being associated with the client rendering a web page provided by the server;
   initiating, by the device, a first session, associated with the first HTTP connection between the client and the server, based on receiving the first data unit;
   storing, by the device, first information associated with the first session,
      the first information including:
         a source IP address associated with the first session,
         a destination IP address associated with the first session, and
         a destination port associated with the first session;
   determining, by the device, a first hash value based on the first information;
   receiving, by the device, a second data unit, the second data unit being associated with establishing a second HTTP connection, of the plurality of HTTP connections, between the client and the server, the second HTTP connection being different from the first HTTP connection;
   determining, by the device, a second hash value using data included in the second data unit;
   determining, by the device, based on comparing the first hash value and the second hash value, that a second session, to be initiated based on the second HTTP connection, is associated with the first session, the first session comprising an active session;
   initiating, by the device and using the first information, the second session, associated with the second HTTP connection between the client and the server, based on the second session being associated with the first session and the first session comprising the active session; and
   updating, by the device, the first information based on the second session.

2. The method of claim 1, where initiating the second session includes:
   determining hardware session information associated with the second session,
      the hardware session information including at least a portion of the first information; and
   establishing a hardware session for the second session using the hardware session information.

3. The method of claim 1, further comprising:
   storing a portion of the first information at a destination port cache associated with the destination port,
   where establishing the second session further includes:
      causing data, associated with the second session, to be transmitted via the destination port based on the portion of the first information stored at the destination port cache.

4. The method of claim 1, where the first information further includes:
   a protocol associated with the first session, and
   where initiating the second session includes:
      initiating the second session further based on the protocol associated with the first session.

5. The method of claim 1, further comprising:
   determining the first information based on a session token associated with the first data unit.

6. The method of claim 1, further comprising:
   associating the first information with an age counter,
      the age counter triggering deletion of the first information after a particular period of inactivity in the first session.

7. The method of claim 5, where the device comprises:
   a switch;
   a router;
   a gateway;
   a server device; or
   a firewall device.

8. The method of claim 1, where the first data unit and the second data unit include HTTP synchronize (SYN) packets.

9. A device comprising:
   a memory, and
   a processor to:
      receive a first data unit associated with a request to establish a first session via a first Hyper-Text Transfer Protocol (HTTP) connection, of a plurality of HTTP connections, associated with a client device rendering a web page provided by a server device,
      initiate the first session based on the first data unit,
      store, in the memory, information associated with the first session,
         the information including:
            first information identifying:
               a source IP address associated with the first session,
               a destination IP address associated with the first session, and
               a destination port associated with the first session, and
            second information identifying:
               a policy associated with the first session,
      determine a first hash value based on the stored information associated with the first session, receive a second data unit associated with a request to establish a second session via a second HTTP connection of the plurality of HTTP connections,
the second HTTP connection being different from the first HTTP connection,
determine a second hash value based on data associated with the second data unit,
compare the first hash value and the second hash value,
determine, based on comparing the first hash value and the second hash value, that the second session is associated with the first session,
the first session comprising an active session;
initiate, using the first information, the second session based on the second information and based on the second session being associated with the first session, and
store, in the memory, information associated with the second session.

10. The device of claim 9, where, when initiating the second session, the processor is further to:
determine hardware session information associated with the first session, and
establish a hardware session for the second session using the hardware session information associated with the first session.

11. The device of claim 9, where the processor is further to:
copy a portion of the stored information, associated with the first session, to a destination port cache associated with a destination port associated with the device,
the portion of the stored information relating to a hardware session associated with the first session, and
forward data, associated with the second session, based on the portion of the stored information copied to the destination port cache.

12. The device of claim 9, where the stored information associated with the first session further includes:
information identifying a protocol associated with the first session, and
where the processor, when initiating the second session, is further to:
initiate the second session further based on the protocol associated with the first session.

13. The device of claim 9, where the processor is further to:
determine the policy associated with the first session based on a session token associated with the first session,
where the session token includes information indicating route information for the first session.

14. The device of claim 9, where the device comprises:
a switch;
a router;
a gateway;
a server device; or
a firewall device.

15. The device of claim 9, where the processor is further to:
associate an age counter value with the stored information associated with first session, and
delete the stored information, associated with the first session, when the age counter value indicates a particular period of inactivity in the first session.

16. The device of claim 9, where the first data unit and the second data unit include HTTP synchronize (SYN) packets.

17. A computer-readable memory device that stores instructions, the instructions comprising:
one or more instructions which, when executed by at least one processor, cause the at least one processor to store information associated with a plurality of sessions associated with a plurality of Hyper-Text Transfer Protocol (HTTP) connections established between a client device and a server device,
the plurality of connections being established to enable the client device to render a web page provided via the server device, and
the stored information identifying a source address, a destination address, and a destination port associated with the plurality of sessions;
one or more instructions which, when executed by the at least one processor, cause the at least one processor to determine, based on the source address, the destination address, and the destination port, a first hash value associated with the plurality of sessions;
one or more instructions which, when executed by the at least one processor, cause the at least one processor to receive a HTTP packet requesting a new session associated with the client device rendering the web page,
one or more instructions which, when executed by the at least one processor, cause the at least one processor to determine, based on the first hash value, that the new session is associated with the plurality of sessions,
the plurality of sessions comprising active sessions; and
one or more instructions which, when executed by the at least one processor, cause the at least one processor to initiate the new session, requested by the HTTP packet, based on the source address, the destination address, and the destination port associated with the plurality of sessions.

18. The computer-readable memory device of claim 17, where the at least one processor is included in one of a switch, a router, a gateway, a server device, or a firewall device.

19. The computer-readable memory device of claim 17, where the instructions further comprise:
one or more instructions to update the information associated with the plurality of sessions based on information associated with the new session and based on the HTTP packet.

20. The computer-readable memory device of claim 17, where the one more instructions to initiate the new session further include:
one or more instructions to identify information associated with a first hardware session associated with the plurality of sessions; and
one or more instructions to establish a second hardware session for the new session based on the information associated with the first hardware session.

21. The computer-readable memory device of claim 20, where the one or more instructions to establish the second hardware session further include:
one or more instructions to store information regarding the second hardware session in a cache table associated with the destination port,
the destination port forwarding data, associated with the new session, based on the stored information regarding the second hardware session.

* * * * *